(No Model.)
W. J. ULRICH.
VEHICLE SEAT.
No. 279,288. Patented June 12, 1883.
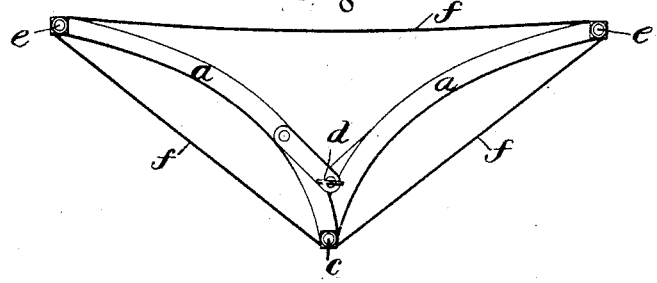
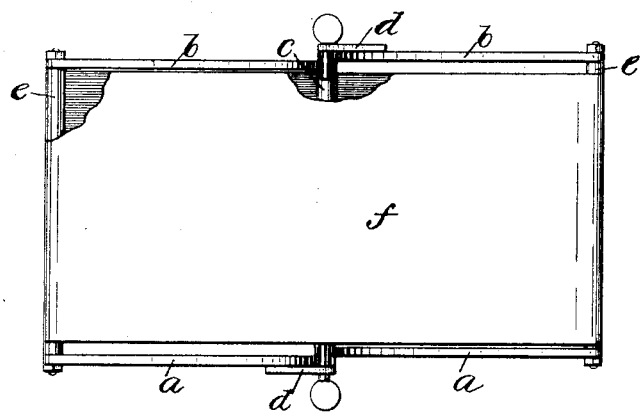
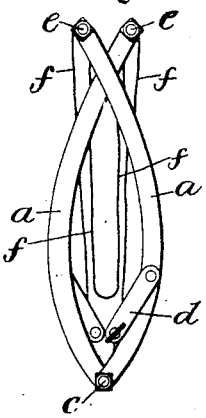
Witnesses
W. M. Bjorkman
Edwin F. Dimock
Inventor
William J. Ulrich
By Simonds & Burdett
Attys.

UNITED STATES PATENT OFFICE.

WILLIAM J. ULRICH, OF EAST HARTFORD, CONNECTICUT.

VEHICLE-SEAT.

SPECIFICATION forming part of Letters Patent No. 279,288, dated June 12, 1883.

Application filed April 18, 1883. (No model.)

*To all whom it may concern:*

Be it known that I, WILLIAM J. ULRICH, of East Hartford, in the county of Hartford and State of Connecticut, have invented a certain new and useful Improved Extra Buggy-Seat, of which the following is a description, reference being had to the accompanying drawings, where—

Figure 1 is a side view of the seat extended. Fig. 2 is a top view of the same. Fig. 3 is a side view of the same folded.

This device is a seat for a third person, where two persons occupy a seat designed for two persons only in a buggy or other vehicle.

The letters $a\,a$ and $b\,b$ denote two sets of arms pivoted together on the rod $c$, and designed at this point to rest upon the buggy-seat. These arms start upward and then branch off laterally in a curve, and this shape, or any other shape which attains the same ends, is an essential feature of the device, for it permits the device to rest upon a buggy-seat between the legs of the two persons occupying the buggy-seat, at the same time rising sufficiently to clear the legs of these two persons, and then branching laterally to attain the proper spread for the third person's seat. These arms are kept extended, when extension is desired, by the buttons or latches $d$. The ends of these curved and pivoted arms are connected by suitable cross-rods, $e$, and a flexible supporting fabric, $f$, runs from end to end of the device. Preferably this supporting fabric $f$ runs entirely around the device, as illustrated in the drawings, covering the frame to a great degree from sight, and protecting it from being injured or injuring other things, this frame being preferably of iron.

I claim as my improvement—

1. In a folding seat, the combination of the curved and pivoted arms $a\,a\,b\,b$ with the supporting fabric connecting the ends with the seat, substantially as described, and for the purpose set forth.

2. In a folding seat, the combination of the curved and pivoted arms $a\,a\,b\,b$ with the fabric $f$, passing entirely around the frame, substantially as described, and for the purpose set forth.

WILLIAM J. ULRICH.

Witnesses:
   CHAS. L. BURDETT,
   A. C. TANNER.